United States Patent [19]
Leifeld

[11] Patent Number: 5,156,224
[45] Date of Patent: Oct. 20, 1992

[54] SCALE FOR CONTINUOUSLY WEIGHING A RUNNING FIBER LAYER

[75] Inventor: Ferdinand Leifeld, Kempen, Fed. Rep. of Germany

[73] Assignee: Trützschler GmbH & Co. KG, Mönchengladbach, Fed. Rep. of Germany

[21] Appl. No.: 666,739

[22] Filed: Mar. 8, 1991

[30] Foreign Application Priority Data

Mar. 10, 1990 [DE] Fed. Rep. of Germany ....... 4007706

[51] Int. Cl.⁵ ............ G01G 19/52; G01G 21/24; B67D 5/08
[52] U.S. Cl. .................. 177/50; 177/255; 222/56
[58] Field of Search ........ 177/50, 255; 222/55, 222/56

[56] References Cited

U.S. PATENT DOCUMENTS 3,869,007  3/1975  Haggstrom et al. ............ 177/255 X
4,463,816  8/1984  MacFarlane ..................... 177/255 X
4,729,442  3/1988  Sichet ............................ 177/50

Primary Examiner—George H. Miller, Jr.
Attorney, Agent, or Firm—Spencer, Frank & Schneider

[57] ABSTRACT

A weighing scale for continuously weighing a fiber layer running therethrough. The weighing scale includes an endless conveyor belt having a transporting face for supporting and advancing the fiber layer and a drive for circulating the conveyor belt. There is further provided a carrier frame on which the conveyor belt and the drive are mounted and a weighing cell for emitting a signal representing the magnitude of a weight applied thereto. The weighing cell supports the carrier frame, the conveyor belt and the drive. An elastic holding element is affixed to the carrier frame. The elastic holding element is elastically readily deformable in a vertical plane, while it is substantially unyielding in a horizontal plane, whereby the carrier frame is prevented by the elastic holding element from motions in horizontal directions.

15 Claims, 4 Drawing Sheets

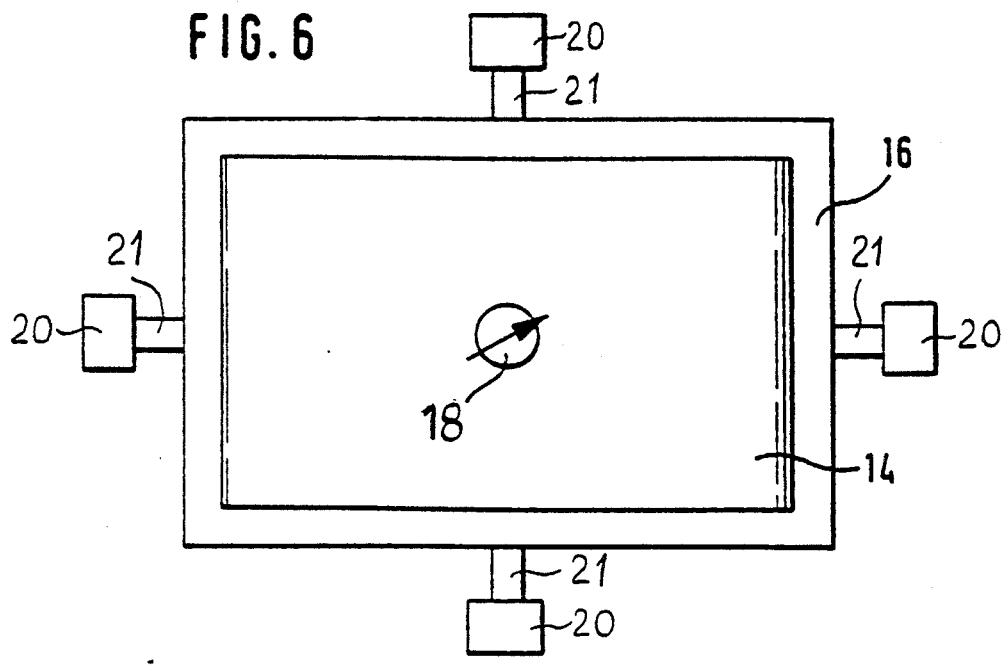
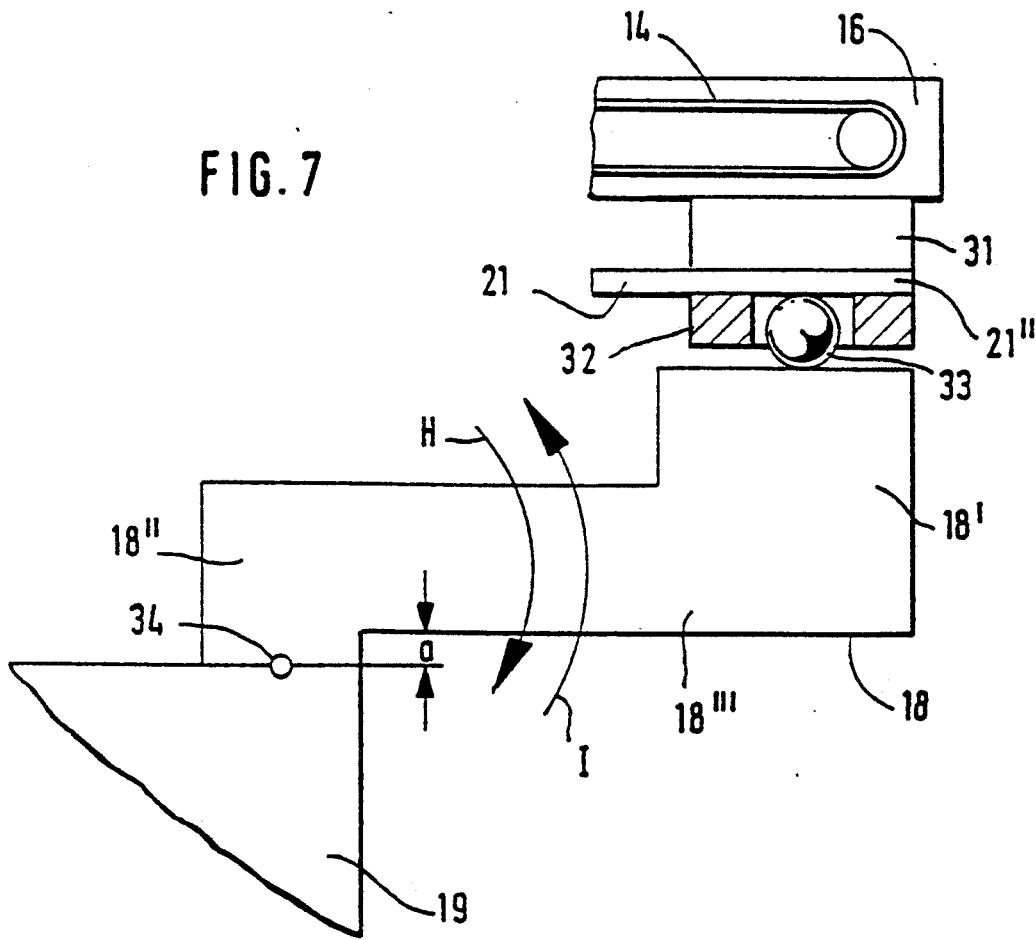

SCALE FOR CONTINUOUSLY WEIGHING A RUNNING FIBER LAYER

CROSS REFERENCE TO RELATED APPLICATION

The application claims the priority of German Application No. P 40 07 706.3 filed Mar. 10, 1990, which is incorporated herein by reference.

BACKGROUND OF THE INVENTION

The invention relates to a scale for continuously weighing a running fiber layer advanced by a fiber metering apparatus for feeding a fiber processing machine. The metering apparatus includes an endless driven conveyor belt on which the fiber layer is deposited and which is weighed by the scale together with the fiber layer disposed thereon.

In a known scale of the above-outlined type, disclosed, for example, in U.S. Pat. No. 2,221,396, the fiber material is deposited on the conveyor belt from above, by means of a chute. The conveyor belt is weighed together with the fiber. While in such a construction the measuring results are not adversely affected by frictional forces, the swinging suspension of the conveyor belt may interfere with the measuring results to a substantial extent because of mechanical jars or air currents generated by the swinging motion.

SUMMARY OF THE INVENTION

It is an object of the invention to provide an improved weighing scale of the above-outlined type from which the discussed disadvantages are eliminated and which in particular permits a weighing of the fiber material without interfering forces.

This object and others to become apparent as the specification progresses, are accomplished by the invention, according to which, briefly stated, the weighing scale includes an endless conveyor belt having a transporting face for supporting and advancing the fiber layer and a drive for circulating the conveyor belt. There is further provided a carrier frame on which the conveyor belt and the drive are mounted and a weighing cell for emitting a signal representing the magnitude of a weight applied thereto. The weighing cell supports the carrier frame, the conveyor belt and the drive. An elastic holding element is affixed to the carrier frame. The elastic holding element is elastically readily deformable in a vertical plane, while it is substantially unyielding in a horizontal plane, whereby the carrier frame is prevented by the elastic holding element from motions in horizontal directions.

The carrier frame is weighed together with the fiber material so that no interfering frictional forces can affect the measuring results. By virtue of the fact that at least one weighing cell, that is, a highly sensitive measuring system is utilized, even the smallest changes in the weight of the fiber can be detected. The elastic holding element is designed to be soft in the vertical direction so that the weighing forces may have their proper effect on the measuring cell. The elastic holding element is, however, designed to be hard in the horizontal directions so that no interfering lateral forces may affect the measuring cell and thus such forces cannot influence the measuring results and further, the weighing scale is stabilized against horizontal oscillations.

The invention has the following additional advantageous features:

Each weighing cell is situated adjacent an elastic holding element and comprises expansion measuring strips (stress gauges). The weighing cells are connected with an inductive path indicator. At least one leaf spring is provided which is secured at one end to a stationary holding element and a weighing cell is arranged in the zone of the free end of the leaf spring. The holding element is oriented horizontally in the vicinity of the vertical plane in which the center of gravity of the conveyor belt supporting the fiber layer to be weighed is situated. The path indicator is electrically connected to a setting member with the intermediary of a regulator. The setting member constitutes the drive motor for the slowly rotating take-in roll of a fiber tuft feeder for the conveyor belt. The carrier frame for the scale is maintained in a horizontal orientation by means of a plurality of leaf springs. The weighing cells and the elastic holding elements (such as leaf springs) engage the carrier frame independently from one another. The weighing cells are arranged at the corners of the carrier frame and the elastic holding elements are situated at mid length of the sides of the carrier frame. One weighing cell is associated with the middle of the carrier frame and the elastic holding elements are associated with the sides of the carrier frame.

BRIEF DESCRIPTION OF THE DRAWING

FIG. 6 is a top plan view of still another preferred embodiment of the invention.

FIG. 7 is a schematic side elevational view showing a support for a component of the invention.

DESCRIPTION OF THE PREFERRED EMBODIMENTS

Figure 1:
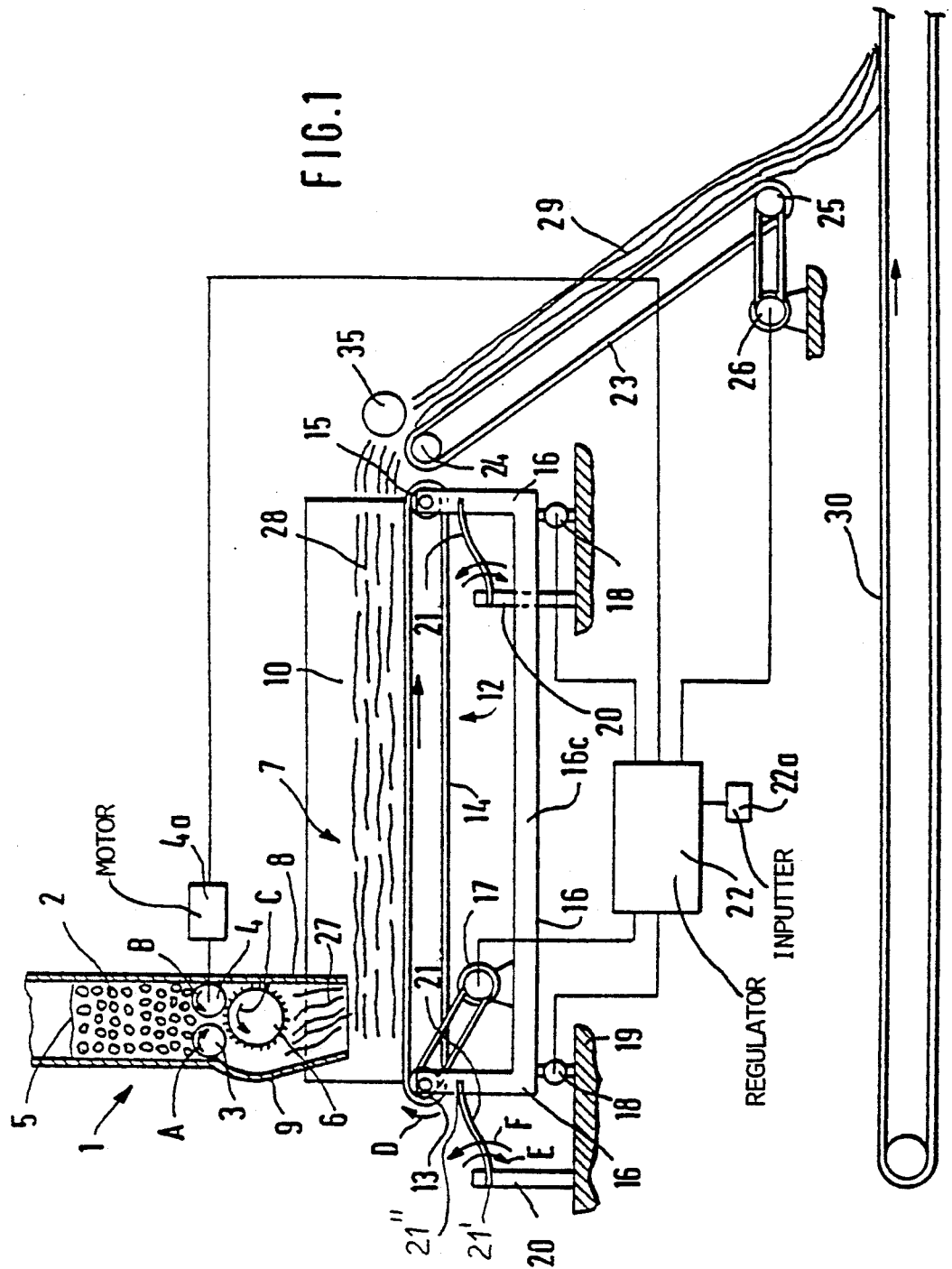
FIG. 1 is a schematic side elevational view of a preferred embodiment of the invention.

FIG. 1 shows a feeding device 1 having a vertically oriented feed chute 2 charged with fiber tuft material 5. Two cooperating delivery rolls 3, 4 are situated at the lower end of the feed chute 2 and draw fiber material downwardly out of the feed chute 2. The delivery rolls 3, 4 are driven by an rpm-variable drive motor 4a and rotate in directions indicated by arrows A, B. Underneath the slowly rotated delivery rolls 3, 4 there is arranged a rapidly rotating opening roll 6 which revolves in the direction of the arrow C and which throws the fiber tufts 27 into a space 7 bounded by a front wall 8, a rear wall 9 and two parallel lateral walls 10 (only one is visible). Underneath the space 7 there is positioned a weighing scale generally designated at 12. The weighing scale 12 has a roller 13 which drives and supports an endless conveyor belt 14. The latter is supported at its other end by an end roller 15. The rollers 13 and 15 are mounted at opposite ends 16a, 16b of a carrier frame 16 which has a generally U-shaped configuration as viewed laterally. The frame has a longitudinal frame base 16c which supports an electric drive motor 17 that rotates the roller 13 in the direction of the arrow D.

The frame base 16c of the carrier frame 16 is supported at its four corners on four weighing cells 18 (only two are visible) which, in turn, are mounted on a stationary foundation 19. On the latter there are disposed four holding elements 20 (only two are visible) each of which firmly holds one end 21' of a respective leaf spring 21. The other, movable end 21" of each leaf spring 21 is movable in a vertical plane as indicated by the arrows E and F and is secured to respective corners of the carrier frame 16.

The weighing cells 18 are designed as pressure measuring boxes which may be, for example, of the type having expansion strips (strain gauges) for generating an electrical signal representing the magnitude of forces applied thereto. The weighing cells 18 are connected by conductors with a regulator 22 which includes a desired value inputter 22a. The regulator 22 is connected with the rpm-variable drive motor 17 and with a drive motor 26 which rotates an end roller 25 supporting, together with another end roller 24, an inclined conveyor belt 23 arranged downstream of the conveyor belt 14. A counterroller 27 cooperates with the end roller 24 for together advancing the fiber material onto the conveyor belt 23 from the conveyor belt 14.

The fiber tufts 27 fed downwardly by the opening roll 6 in the zone of the end roller 13 fall on the upper flight of the conveyor belt 14 and form a fiber layer 28 thereon which proceeds toward the other end roller 15. The weight of the fiber layer 28, the conveyor belt 14, the carrier frame 16 and the drive motor 17, sensed by the weighing cells 18 is applied as an electric signal to the regulator 22 where it is compared with the desired value applied to the regulator 22 by the desired value inputter 22a. The differential signal generated during such a comparison is used to control the drive motors 4a, 17 and 26. The fiber material is transferred from the conveyor belt 23 to a further conveyor belt 30 for advancing the fiber material to a further fiber processing station or storage device (not shown).

Figure 2:
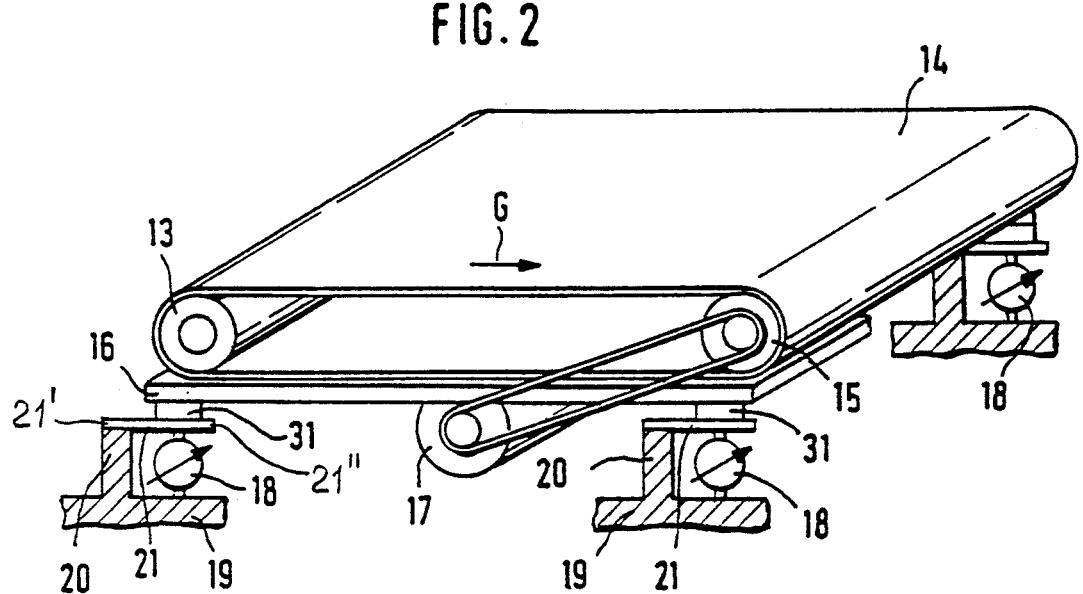
FIG. 2 is a schematic perspective view of a modified part of the structure illustrated in FIG. 1.

As shown in FIG. 2, the carrier frame 16 is supported on the leaf springs 21 by means of intermediary members 31. The arrow G designates the direction of travel of the fiber transport face of the conveyor belt 14.

Figure 3:
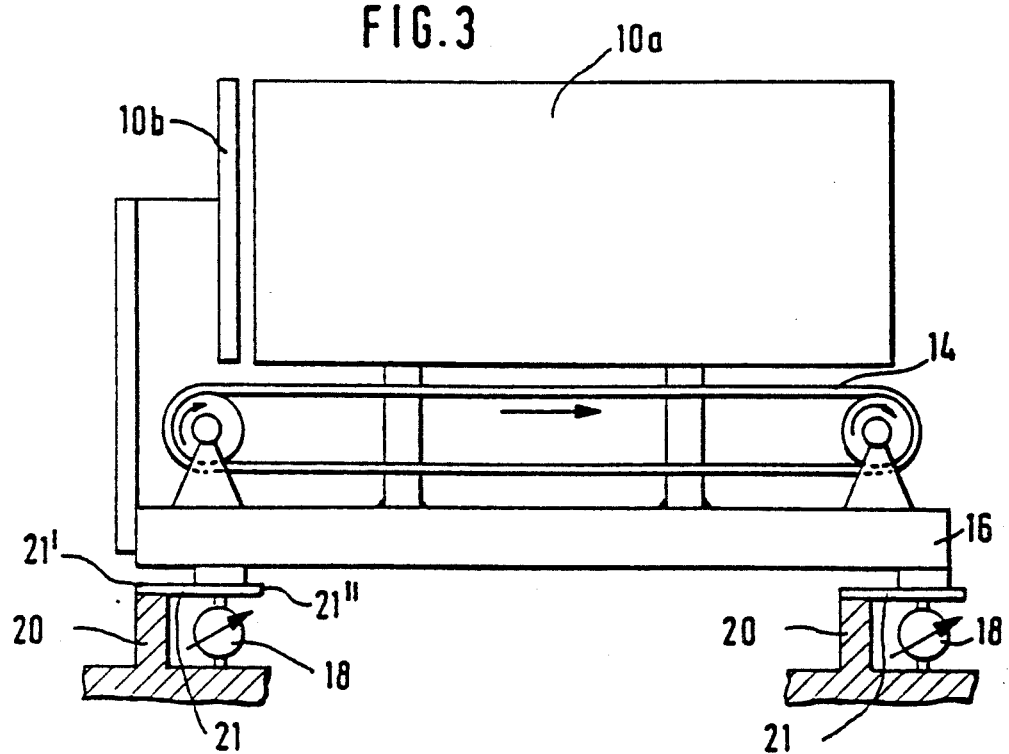
FIG. 3 is a schematic side elevational view of a modified part of the structure illustrated in FIG. 1.

Turning to FIG. 3, above the conveyor belt 14 there are positioned two parallel, longitudinally extending support walls 10a (only one is visible) and a transverse end wall 10b which is situated at the upstream end of the conveyor belt 14.

Figure 4:
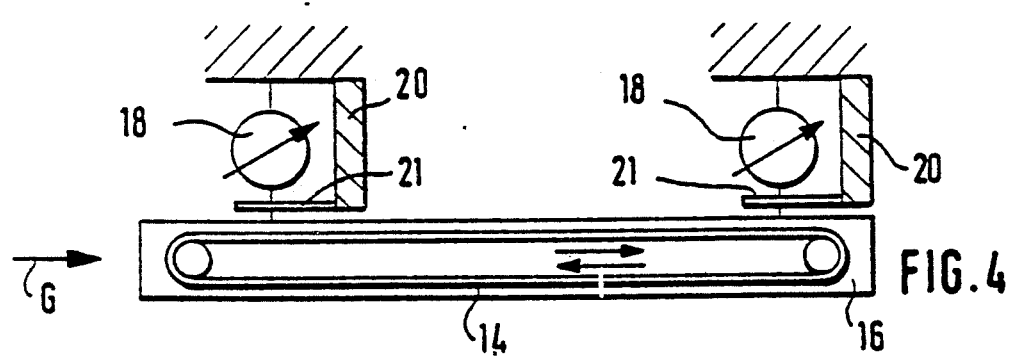
FIG. 4 is a schematic side elevational view of another preferred embodiment of the invention.

Turning to FIG. 4, the carrier frame 16 is, together with the conveyor belt 14, situated underneath and thus suspended from, the leaf springs 21 of the respective weighing cells 18.

Figure 5A:
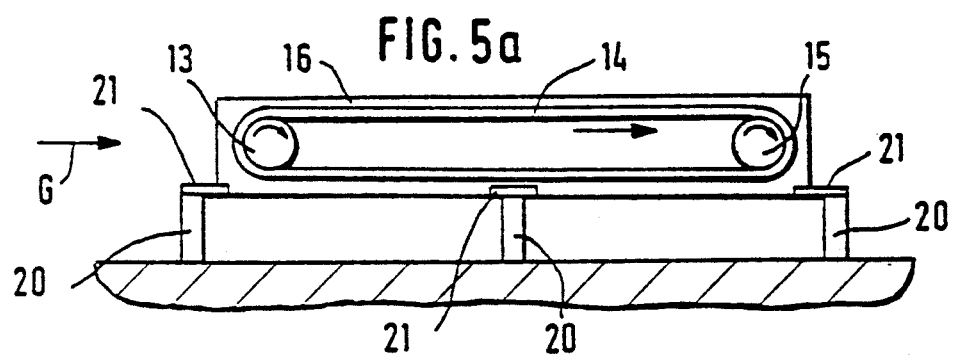
FIGS. 5a, 5b and 5c are side elevational, front elevational and top plan views, respectively, of another preferred embodiment of the invention.
Figure 5B:
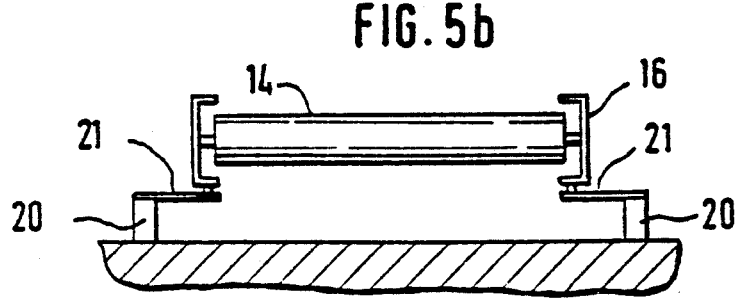
Figure 5C:
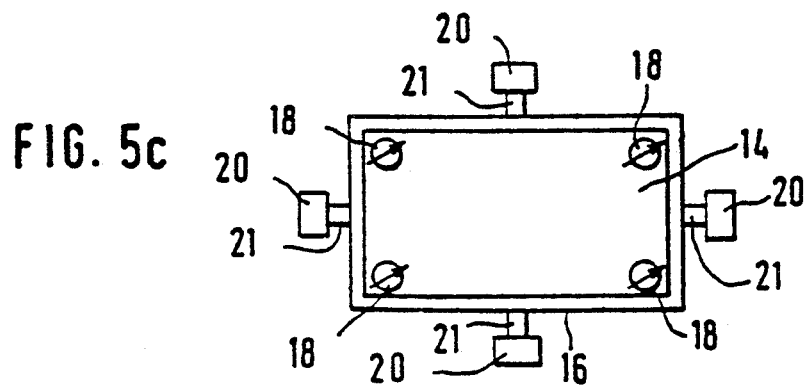

Turning to FIGS. 5a-5c, the weighing cells 18 are arranged at the corners of the carrier frame 16, whereas the holding elements 20 with the associated leaf springs 21 are situated at mid length of the respective four sides of the carrier frame 16. In the arrangement illustrated in FIG. 6 there is provided a single weighing cell 21 in the center of the carrier frame 16 and the holding elements 20, with the respective leaf springs 21 are situated at mid length of the four sides of the carrier frame 16.

Turning to FIG. 7, there is shown the downstream end of the carrier frame 16 with the conveyor belt 14, supported by an intermediate component 31 on the free end 21" of a leaf spring 21. The leaf spring 21 is supported on a bearing element 32 including a ball 33 which in turn, rests on the upper face of one end 18' of a weighing cell 18. The other end 18" of the weighing cell 18 is stationarily affixed to the foundation 19. The end 18' and a centerpiece 18''' are rotatable in the direction of the curved arrows H, I about an axis 34 situated in the zone of the end 18" of the weighing cell 18. Such a local rotary motion (excursion) which occurs upon a change in the weight of the fiber material on the conveyor belt 14 is converted by strain gauges (not shown) of the weighing cell 18 into electrical pulses which are applied by conductors to the regulating device 22 (shown in FIG. 1).

The bottom face of the center portion 18''' projects beyond the lower bounding face of the end 18" by a distance a so that a rotation about the axis 34 is possible without the zones 18" and 18''' contacting the foundation 19 even if the foundation 19 is designed to be throughgoing underneath the weighing cell 18. In addition to the weight of the fibers, the sensed weight also includes the weight of the carrier frame, the conveyor belt and the belt drive devices so that interfering lateral forces are being opposed by the significant inertia represented by the gross mass.

The leaf springs 21 are so designed and oriented in their installed state that they are soft and thus readily deformable in a vertical plane, while they are significantly resistant to deformations in a horizontal plane, due to their stiffness in the horizontal direction. All leaf springs have preferably the same spring characteristic. According to requirements the leaf springs may, in a certain apparatus, be of softer and in another apparatus, of harder spring characteristics, that is, the ends 21" of the leaf springs may, dependent upon the spring characteristics, deflect to different distances while the same force is applied thereto.

It will be understood that the above description of the present invention is susceptible to various modifications, changes and adaptations, and the same are intended to be comprehended within the meaning and range of equivalents of the appended claims.

What is claimed is:

1. In a weighing scale for continuously weighing a fiber layer running therethrough; the weighing scale including an endless conveyor belt having a transporting face for supporting and advancing the fiber layer; and a drive means for circulating the conveyor belt; the improvement comprising:

(a) a carrier frame; said conveyor belt and said drive means being mounted on said carrier frame and being carried thereby;
    (b) weighing means for emitting a signal representing the magnitude of a weight applied thereto; said weighing means supporting said carrier frame, said conveyor belt and said drive means; said weighing means comprising a plurality of working cells; and
    (c) a plurality of elastic holding elements affixed to said carrier frame; said elastic holding elements being elastically readily deformable in a vertical plane and being substantially unyielding in a horizontal plane, whereby said carrier frame is prevented by said elastic holding elements from motions in horizontal directions; each weighing cell being situated adjacent a separate one of said elastic holding elements.

2. A weighing scale as defined in claim 1, wherein each said elastic holding element comprises a leaf spring.

3. A weighing scale as defined in claim 2, further comprising a stationary support; each said leaf spring having a first and affixed to said stationary support and a second end connected to said carrier frame.

4. A weighing scale as defined in claim 3, wherein the weighing cells are situated adjacent said second end of a respective said leaf spring.

5. A weighing scale as defined in claim 1, the elastic holding elements positioning said carrier frame in a horizontal orientation.

6. A weighing scale as defined in claim 1, wherein said carrier frame is disposed above said weighing means.

7. A weighing scale as defined in claim 1, wherein said carrier frame is disposed below said weighing means.

8. A weighing scale as defined in claim 1, wherein said elastic holding elements are connected directly to said carrier frame.

9. A weighing scale as defined in claim 1, wherein each said weighing cell has first and second ends; further comprising a stationary foundation; said first end being secured to said stationary foundation; said carrier frame being secured to said second end of each said weighing cell; each said weighing cell being pivotal about a pivotal axis.

10. A combination of a weighing scale for continuously weighing a fiber layer running therethrough and a fiber material feeder;
said fiber material feeder comprising
(a) a feed chute provided with an outlet;
(b) delivery rolls arranged at said outlet for withdrawing fiber material from said feed chute; and
(c) a motor means for driving said delivery rolls; said the weighing scale comprising
(a) an endless conveyor belt having a transporting face for supporting and advancing the fiber layer; said output of said feed chute being situated above the conveyor belt;
(b) a drive means for circulating the conveyor belt;
(c) a carrier frame; said conveyor belt and said drive means being mounted on said carrier frame and being carried thereby;
(d) weighing means for emitting a signal representing the magnitude of a weight applied thereto; said weighing means supporting said carrier frame, said conveyor belt and said drive means;
(e) an elastic holding element affixed to said carrier frame; said elastic holding element being elastically readily deformable in a vertical plane and being substantially unyielding in a horizontal plane, whereby said carrier frame is prevented by said elastic holding element from motions in horizontal directions; and
(f) a regulating device having an input connected to an output of said weighing means; said regulating device having an output connected to said motor means, whereby the rpm of said delivery rolls is regulated as a function of weights sensed by said weighing means.

11. A weighing scale as defined in claim 10, wherein said elastic holding element is horizontally adjacent a vertical plane containing the center of gravity of the mass formed of the carrier frame, the drive means, the conveyor belt and the fiber layer thereon.

12. A weighing scale as defined in claim 10, wherein said elastic holding element is present in a plurality; said carrier frame having sides and a center; and said weighing means comprising a single weighing cell; the elastic holding elements engaging said carrier frame at mid length of said sides and said weighing cell engaging carrier frame at the center thereof.

13. A weighing scale as defined in claim 10, wherein said weighing means is directly connected with said carrier frame.

14. A weighing scale as defined in claim 10, wherein said weighing means comprises a weighing cell having first and second ends; further comprising a stationary foundation; said first end being secured to said stationary foundation; said carrier frame being secured to said second end of said weighing cell; said weighing cell being pivotal about a pivotal axis.

15. In a weighing scale for continuously weighing a fiber layer running therethrough; the weighing scale including an endless conveyor belt having a transporting face for supporting and advancing the fiber layer; and a drive means for circulating the conveyor belt; the improvement comprising:
(a) a carrier frame having a plurality of sides and corners; said conveyor belt and said drive means being mounted on said carrier frame and being carried thereby;
(b) a plurality of elastic holding elements affixed to said carrier frame; said elastic holding elements engaging said carrier frame at mid length of said sides; said elastic holding elements being elastically readily deformable in a vertical plane and being substantially unyielding in a horizontal plane, whereby said carrier frame is prevented by said elastic holding elements from motions in horizontal directions; and
(c) weighing means, comprising a plurality of weighing cells for emitting signals representing the magnitude of a weight applied thereto; said weighing cells supporting said carrier frame, said conveyor belt and said drive means; said elastic holding elements and said weighing cells engaging said carrier frame independently from one another, and said weighing cells engaging said carrier frame at said corners.

* * * * *